(12) United States Patent
Chung et al.

(10) Patent No.: US 7,079,471 B1
(45) Date of Patent: Jul. 18, 2006

(54) OPTICAL PICKUP USING TWO LASER BEAM SOURCES OF DIFFERENT WAVELENGTHS FOR AN OPTICAL DISK DRIVE AND A CONVERTER TO OPTIMIZE A LIGHT BEAM REFLECTED OFF AN OPTICAL DISC FOR DETECTION BASED ON REFLECTED LIGHT BEAM WAVELENGTH

(75) Inventors: Chong-sam Chung, Sungnam (KR); Chul-woo Lee, Sungnam (KR); In-sik Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/442,095

(22) Filed: Nov. 17, 1999

(30) Foreign Application Priority Data

Nov. 17, 1998 (KR) .............................. 98-49165

(51) Int. Cl.
*G11B 7/135* (2006.01)

(52) U.S. Cl. .............................. 369/112.15; 369/112.24; 369/53.11

(58) Field of Classification Search .............. 369/112.1, 369/112.15, 112.16, 112.28, 53.11
See application file for complete search history.

(56) References Cited

U.S. PATENT DOCUMENTS 4,612,437 A * 9/1986 Ohsato .................... 250/201.5
5,208,801 A * 5/1993 Finegan ...................... 369/284

(Continued)

FOREIGN PATENT DOCUMENTS

| CN | 97113095.7 | 12/1997 |
| JP | 9-54973 | 2/1997 |
| JP | 10-134394 | 5/1998 |
| JP | 10-149571 | 6/1998 |

OTHER PUBLICATIONS

MAT (Machine Assisted Translation) of JP 10–134394.*

*Primary Examiner*—Aristotelis M. Psitos
(74) *Attorney, Agent, or Firm*—Stein, McEwen & Bui, LLP (57) ABSTRACT

First and second laser beam sources generate first and second laser beams of different wavelengths, respectively. A first collimating lens diverges the first laser beam at a predetermined angle so as to permit a fracture surface aberration of the first laser beam to fall below a predetermined value when the first laser beam generated from the first laser beam source is collected on the signal layer of the optical disk. A light receiving lens collects the laser beam reflected from the signal layer of the optical disk on a photo diode in the form of an optical spot of a predetermined size. A holographic lens has a pattern by which the first laser beam is converted into parallel rays so that the size of a spot of the first laser beam becomes identical with the size of a spot of the second laser beam as projected on the detecting section. The pattern of the holographic lens has a concentric annular concave-convex portion in which a plurality of annular prominences and depressions are arranged, and the depression and the prominence have a width which is gradually decreased from a center toward a most outer circumference of the concentric annular concave-convex portion. Further, an inner surface of each prominence has a step-like shape formed with at least one step. Preferably, the number of the step ranges from three to five. Accordingly, diameters of the optical spots of the two laser beams of different wavelengths are almost identical when the laser beams are transmitted through the holographic lens so that the optical spots are formed on the photo diode. As a result, with one objective lens and photo diode, information of two types of optical disks for laser beams of different wave lengths can be reproduced.

15 Claims, 8 Drawing Sheets

U.S. PATENT DOCUMENTS

| | | | | |
|---|---|---|---|---|
| 5,272,667 A | * | 12/1993 | Yamada et al. | 369/113 |
| 5,303,221 A | * | 4/1994 | Maeda et al. | 369/112 |
| 5,400,311 A | * | 3/1995 | Komma et al. | 369/103 |
| 5,438,561 A | * | 8/1995 | Van et al. | 369/100 |
| 5,696,749 A | * | 12/1997 | Brazas et al. | 369/109 |
| 6,084,845 A | * | 7/2000 | Mizuno | 369/112.28 |
| 6,088,322 A | * | 7/2000 | Broome et al. | 369/112.26 |
| 6,181,668 B1 | * | 1/2001 | Kajiyama et al. | 369/112 |
| 6,222,812 B1 | * | 4/2001 | Yoo et al. | 369/112.16 |
| 6,304,541 B1 | * | 10/2001 | Chang et al. | 369/112.06 |
| 6,304,542 B1 | * | 10/2001 | Dang et al. | 369/112.23 |
| 6,337,841 B1 | * | 1/2002 | Kim et al. | 369/112.06 |

* cited by examiner

OPTICAL PICKUP USING TWO LASER BEAM SOURCES OF DIFFERENT WAVELENGTHS FOR AN OPTICAL DISK DRIVE AND A CONVERTER TO OPTIMIZE A LIGHT BEAM REFLECTED OFF AN OPTICAL DISC FOR DETECTION BASED ON REFLECTED LIGHT BEAM WAVELENGTH

BACKGROUND OF THE INVENTION

The present invention relates to an optical disk drive for reading information from an optical disk using a laser beam, and more particularly to an optical pickup for an optical disk drive for reproducing information from two different types of optical disks using laser beams of different wavelengths.

Generally, an optical disk drive is an apparatus for reproducing information recorded on an optical disk using laser beams. An optical disk is a disk-type information recording medium which has a signal layer formed by a plurality of pits and lands. The optical disk drive projects a laser beam onto the signal layer of the optical disk, detects signals from the reflectivity, the phase and the polarized variation of the reflected laser beam and then processes the signals so as to reproduce the desired information.

Figure 1:
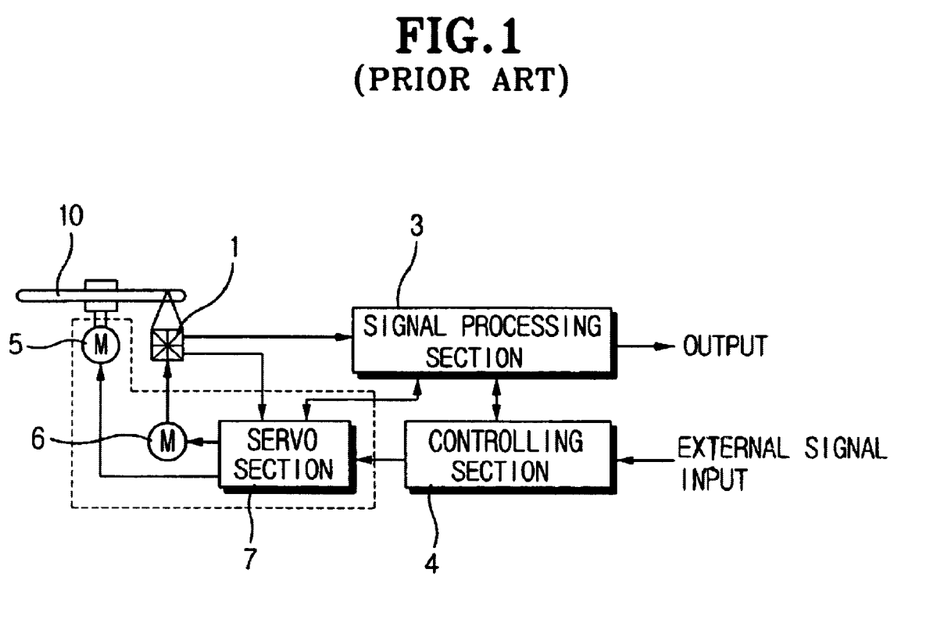
FIG. 1 is a schematic view of a conventional optical disk drive.

FIG. 1 is a block diagram of a conventional optical disk drive. As shown, the conventional optical disk drive includes an optical pickup 1 for projecting a laser beam to an optical disk 10 and for detecting the signal from the reflected laser beam; a driving section 8 for moving the optical pickup 1 to the desired position on the signal layer; a signal processing section 3 for processing the detected signal so as to convert the signal into the desired information; and a controlling section 4 for controlling the above elements. The driving section 8 includes a spindle motor 5 for rotating the optical disk 10; a thread motor 6 for moving the optical pickup 1; and a servo section 7 for driving the spindle motor 5 and the thread motor 6.

Upon receipt of an external operation signal, the optical pickup 1 is moved to a predetermined position relative to the optical disk 10 and detects the signal recorded in the signal layer of the optical disk 10 by projecting a laser beam onto the optical disk 10. The detected signal is processed, converted into information by the signal processing section 3 and then outputted to other external devices (not shown).

Figure 2:
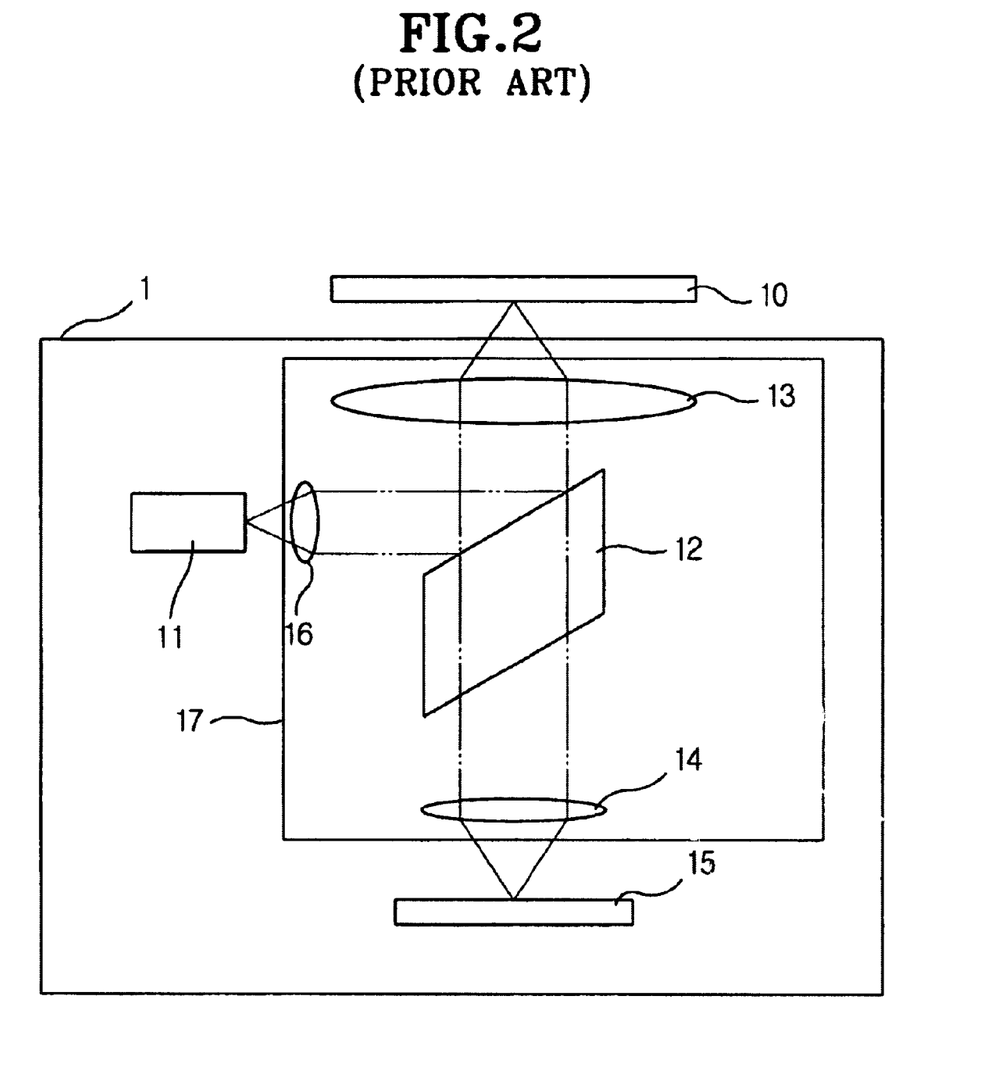
FIG. 2 is a schematic view of the optical pickup shown in FIG. 1.

The optical pickup 1 is an important element of the optical disk drive which detects the information recorded in the signal layer of the optical disk 10. FIG. 2 is a diagram of a conventional optical pickup 1. The optical pickup 1 is usually positioned below the optical disk 10. The optical pickup 1 includes a laser beam source 11 for generating the laser beam along with an optical system 17 for projecting the laser beam generated from the laser beam source 11 onto the optical disk 10 and for transmitting the reflected laser beam. A detector 15 detects the reflected laser beam to generate the signal. The laser beam source 11 is typically a laser diode, while the detector 15 is typically a photo diode which detects the laser beam and outputs a corresponding electric current signal. The optical system 17 includes a collimating lens 16, a prism 12, an objective lens 13, and a light receiving lens 14.

The optical pickup 1 is operated as follows. First, the laser beam generated from the laser beam source, i.e., from the laser diode 11, is transmitted through the collimating lens 16 and converted into parallel rays. Then, the parallel rays are reflected from the prism 12 toward the optical disk 10. The reflected laser beam is focused on the signal layer of the optical disk 10 through the objective lens 13. The collected laser beam is then reflected from the signal layer, transmitted through the objective lens 13 again so as to be converted into parallel rays before it is projected to the prism 12. The prism 12 either reflects or transmits the laser beam. In other words, the prism 12 reflects the laser beam proceeding from the collimating lens 16 to the optical disk 10, while transmitting the laser beam proceeding from the optical disk 10 to the light receiving lens 14. The laser beam transmitted through the prism 12 is collected by the light receiving lens 14, so that the laser beam is converged on the surface of the detector, i.e., on the photo diode 15 in the form of a spot. The photo diode 15 detects such a spot, and outputs an electric current signal. The electric current signal is inputted to the signal processing section 3 where the electric current signal is processed.

The capacity of an optical disk, whose information is reproduced by the optical disk drive constructed as above, depends on the wavelengths of the laser beams generated from the laser beam sources of the optical pickup 1. More specifically, the shorter the wavelength of the laser beam, the smaller the diameter of the optical spot, so that the pits and the lands may be more densely formed. As the information recording density of the optical disk is increased, a greater amount of data can be recorded on the optical disk (in comparison with another optical disk of identical size).

Known optical disk drives reproduce information from optical disks using a laser beam, named 'red laser', having a wavelength of approximately 650 nm (nanometer). Recently, another type of optical disk drive utilizing a high density system has been developed which reproduces the information on the optical disk using a laser beam named 'blue laser', having a wavelength of approximately 410 nm. The sales of such high density optical disk drives are increasing.

Such density optical disk drives have a shortcoming in that the laser beam source of the optical pickup 1, i.e., the laser diode, generates a laser beam of only one wavelength. Accordingly, the recently developed high density optical disk using a short wavelength laser beam of 410 nm may not be used to read the older type of optical disk drive employing a laser beam having long wavelength of 650 nm. Similarly, the older type of optical disks may not be used with the new optical disk drives which uses the short wavelength laser beam of 410 nm. As a result, the optical disks for two different types of the optical disk drivers may not be interchangeably used.

Accordingly, an optical disk drive capable of using both types of the optical disks has been developed. Such a drive uses both a high density optical pickup for the short wavelength laser beam of 410 nm and a low density optical pickup for the long wavelength laser beam of 650 nm. More specifically, both optical pickups are mounted on the optical disk drive, so that the optical pickup corresponding to the optical disk whose information needs to be reproduced is selectively used. Another known device uses two different laser diodes and two different objective lenses, optimized in accordance with two different laser beams respectively generated from the laser diodes, with one optical pickup. Each objective lens is selectively used in accordance with the type of optical disk whose information needs to be reproduced. These known optical disk drives, however, have shortcomings in that they require too many parts with complex structures, resulting as an unduly high manufacturing cost.

SUMMARY OF THE INVENTION

The present invention has been developed to overcome above-described shortcomings of the prior art, and accordingly it is an object of the present invention to provide an optical pickup of an optical disk drive which has a simple structure utilizing one objective lens and one photo diode to reproduce information from two types of optical disks designed for laser beams of different wavelengths.

The above object is accomplished by an optical pickup according to the present invention including first and second light sources, an optical system, optical detecting means, and optical conversion means.

The first and second laser beam sources both use laser diodes to generate first and second laser beams, respectively.

The optical system comprises a first collimating lens diverging the first laser beam at a predetermined angle that permits a fracture surface aberration of the first laser beam to fall below a predetermined value when the first laser beam generated from the first laser beam source is collected on the signal layer of the optical disk; a second collimating lens converting the second laser beam generated from the second laser beam source into parallel rays; a prism reflecting the laser beam transmitted through the first and second collimating lenses toward the optical disk, while transmitting the laser beam reflected from the signal layer of the optical disk; an objective lens collecting the laser beam reflected from the prism onto the signal layer of the optical disk; and a light receiving lens collecting the laser beam reflected from the signal layer of the optical disk on the optical detecting means in the form of an optical spot of a predetermined size. Here, when the first laser beam has a wavelength of 640–660 nm (or 770 –800 nm for a CD), and when the second laser beam has a wavelength of 400–420 nm, the predetermined value is less than or equal to $0.08\lambda$ where the $\lambda$ is the wavelength, and the predetermined angle ranges from 0.4° to 0.6°.

The optical detecting means includes a photo diode.

The optical conversion means converts the first and second laser beams reflected from the signal layer of the optical disk into one that can be detected by the optical detecting means, and includes a holographic lens having a pattern by which the first laser beam is exclusively converted into a parallel ray so that the size of a spot of the first laser beam becomes identical with the size of a spot of the second laser beam in the detecting section.

The pattern of the holographic lens has a concentric annular concave-convex portion in which a plurality of annular prominences and depressions are arranged. The depression and the prominence have a width which is gradually decreased from a center toward a most outer circumference of the concentric annular concave-convex portion. Further, an inner surface of each prominence has a step-like shape formed with at least one step. Preferably, the number of steps ranges from three to five.

The second laser beam generated from the second light source is converted into parallel rays through the second collimating lens, reflected from the prism, and then collected on the signal layer of the optical disk through the objective lens. The second laser beam reflected from the signal layer of the optical disk is directly transmitted through the prism and the holographic lens, to be converged in the form of an optical spot through the light receiving lens. The optical spot is converted into the electric current signal through the photo diode (the optical detecting means) and is outputted.

The first laser beam generated from the first light source is diverged into a divergence ray of a predetermined angle through the first collimating lens, reflected from the prism, and collected on the signal layer of the optical disk through the objective lens. Since the first laser beam is projected to the objective lens in the form of the divergence ray, the fracture surface aberration is kept within the acceptable range. The first laser beam reflected from the signal layer is converted into parallel rays through the holographic lens after being transmitted through the objective lens and the prism. The first laser beam which is converted into parallel rays, is converted on the photo diode (the optical detecting means) in the form of an optical spot which is almost identical with the optical spot of the second laser beam. The photo diode detects the optical spot and output the electric current signal.

In the optical pickup according to the present invention, the two types of optical disk, requiring different laser beams of respective wave lengths, are reproducible through one objective lens and a single photo diode by utilizing a holographic lens. Accordingly, as fewer parts are required, the structure becomes simpler and manufacturing costs decrease.

BRIEF DESCRIPTION OF THE DRAWINGS

The above objects and advantages will be more apparent by describing the present invention with reference to the accompanied reference drawings, in which.

DETAILED DESCRIPTION OF THE PREFERRED EMBODIMENT

Figure 3A:
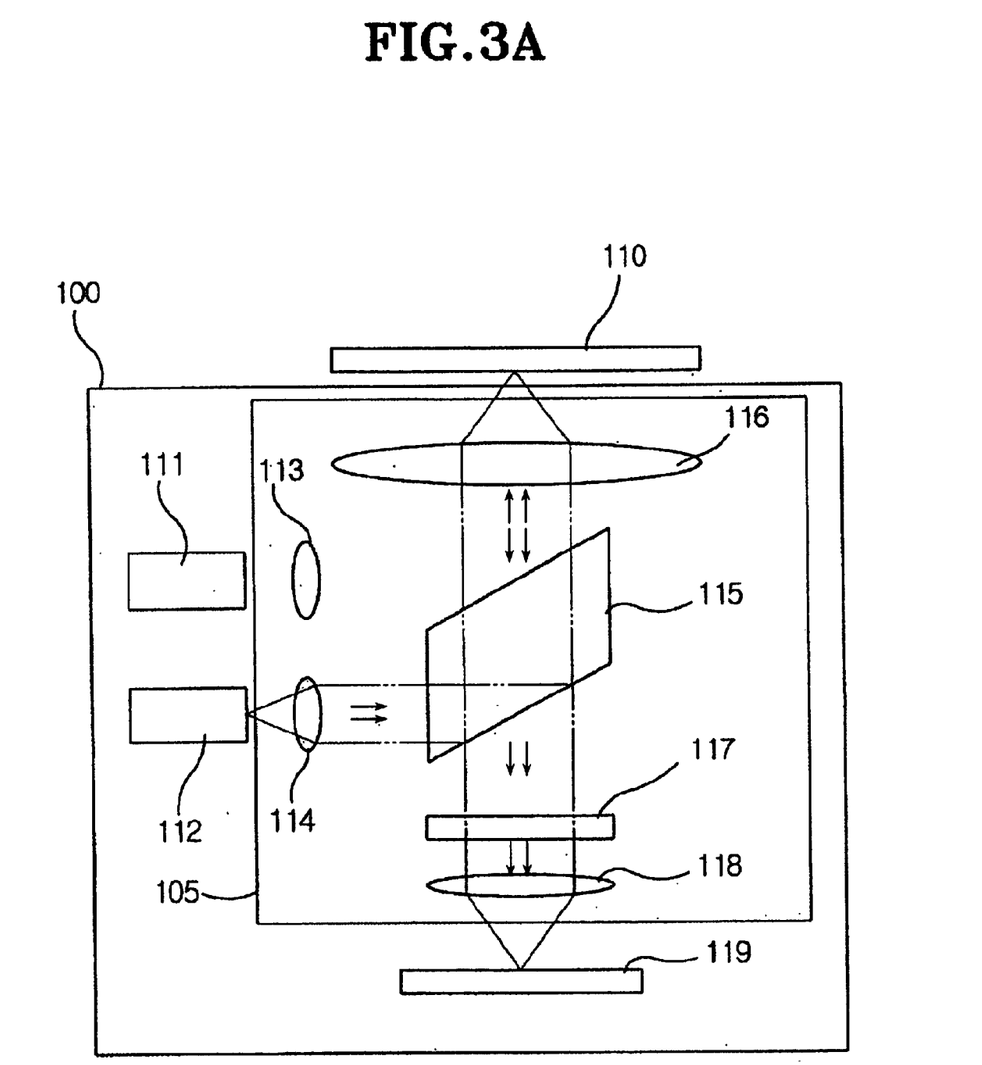
FIG. 3A is a schematic view of an optical pickup according to the preferred embodiment of the present invention showing a light path of a short wavelength laser beam.

FIG. 3A is a schematic view of an optical pickup according to the preferred embodiment of the present invention showing a light path of a short wavelength laser beam. An optical pickup 100 according to the preferred embodiment of the present invention, includes a first laser beam source 111 and a second laser beam source 112 each generating a laser beam of different wavelengths; an optical system 105 for collecting the laser beams generated from the first and second laser beam sources 111 and 112, reflected from a signal layer of an optical disk 110 and for transmitting the reflected laser beams toward a place opposite the optical disk 110, the optical system 105 including a holographic lens 117; and a detector 119 for detecting the laser beams reflected from the signal layer and for generating a signal.

The first and second laser beam sources 111 and 112 are formed of laser diodes. The first laser beam, generated from the first laser beam source 111, has a wavelength which ranges approximately from 640 nm to 660 nm (or 770–800 nm for a CD), and is preferably 650 nm. The second laser beam, generated from the second laser beam source 112, has a wavelength which ranges approximately from 400 nm to 420 nm, and is preferably 410 nm. The first laser beam is for reproducing the information from the old type of optical disk (DVD and CD), i.e., from a low density optical disk 110' (see FIG. 3B), while the second laser beam is for reproducing the information from the recently developed high density optical disk 110.

The optical system generally comprises a prism 115, an objective lens 116, and a light receiving lens 118. The prism 115 reflects the laser beam which has been transmitted through first and second collimating lenses 113 and 114 toward the optical disk 110. Further, the laser beam reflected from the signal layer of the optical disk 110 is projected to the detector 119 after being transmitted through the prism 115. The objective lens 116 collects the laser beam which has been reflected from the prism 115 toward the optical disk 110, onto the signal layer of the optical disk 110. The light receiving lens 118 collects the laser beam which has been reflected from the signal layer and projects the light onto the detector 119 in the form of a spot. The objective lens 116 is optimized in accordance with the laser beam from the second laser beam source 112, so that the second laser beam may be converged on the exact position of the signal layer of the optical disk 110.

The second collimating lens 114 converts the second laser beam generated from the second laser beam source 112 into parallel rays, while the first collimating lens 113 converts the first laser beam generated from the first laser beam source 111 into an incomplete parallel ray, i.e., a divergence ray of a predetermined angle. The first collimating lens 113 diverges the first laser beam at a predetermined angle to lower the fracture surface aberration of the optical spot of the first laser beam, which is collected onto the signal layer by the objective lens 116 optimized in accordance with the second laser beam within an acceptable limit. For the laser beam reflected from the signal layer of the optical disk 110 to be detected by the detector 119, it is generally known that the fracture surface aberration of the optical spot should be less than or equal to $0.08\lambda$ ('$\lambda$' denotes wavelength), when the spot is formed on the signal layer of the optical disk 110 after being collected by the objective lens 116. When the first laser beam is projected to the objective lens 116, optimized in accordance with the second laser beam, the fracture surface aberration of the spot on the signal layer of the optical disk 110 raises above $0.1\lambda$. Accordingly, to lower the fracture surface aberration within the acceptable range, i.e., to lower the fracture surface aberration less than or equal to $0.08\lambda$, the first collimating lens 113 converts the first laser beam into the divergence ray of a predetermined angle. Lowering the fracture surface aberration is achieved by adjusting the distance between the first laser beam source 111 and the first collimating lens 113. Here, the predetermined angle ranges approximately from 0.4°–0.6°, and is preferably 0.5°.

The detector 119 is preferably a photo diode for detecting the light and outputting an electric current signal. The photo diode 119 is also optimized for the size of the spot which is formed as the second laser beam is collected.

Figure 4:
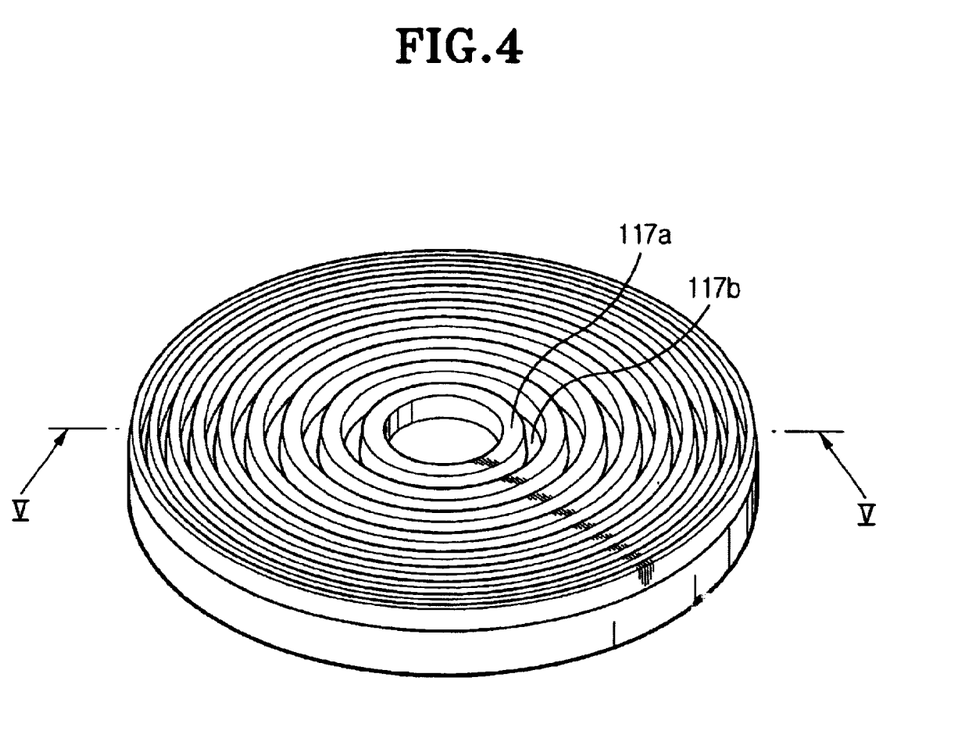
FIG. 4 is a perspective view of a holographic lens.
Figure 5A:
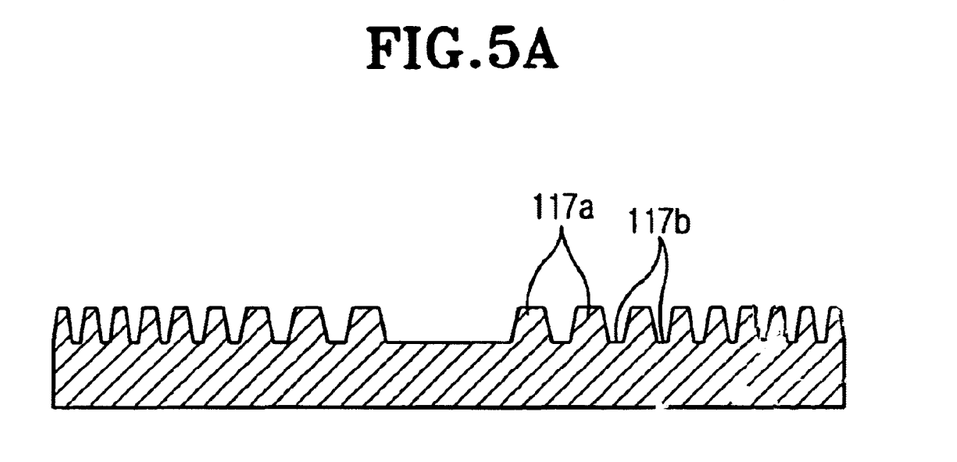
FIG. 5A is a sectional view of the holographic lens shown in FIG. 4 taken on line V—V of FIG. 4.
Figure 5B:
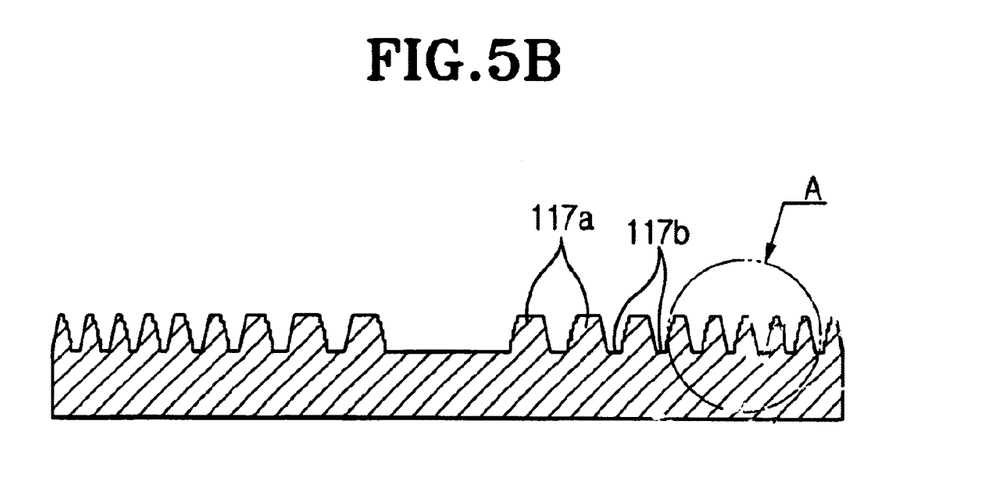
FIG. 5B is a sectional view of the holographic lens shown in FIG. 5A.
Figure 6:
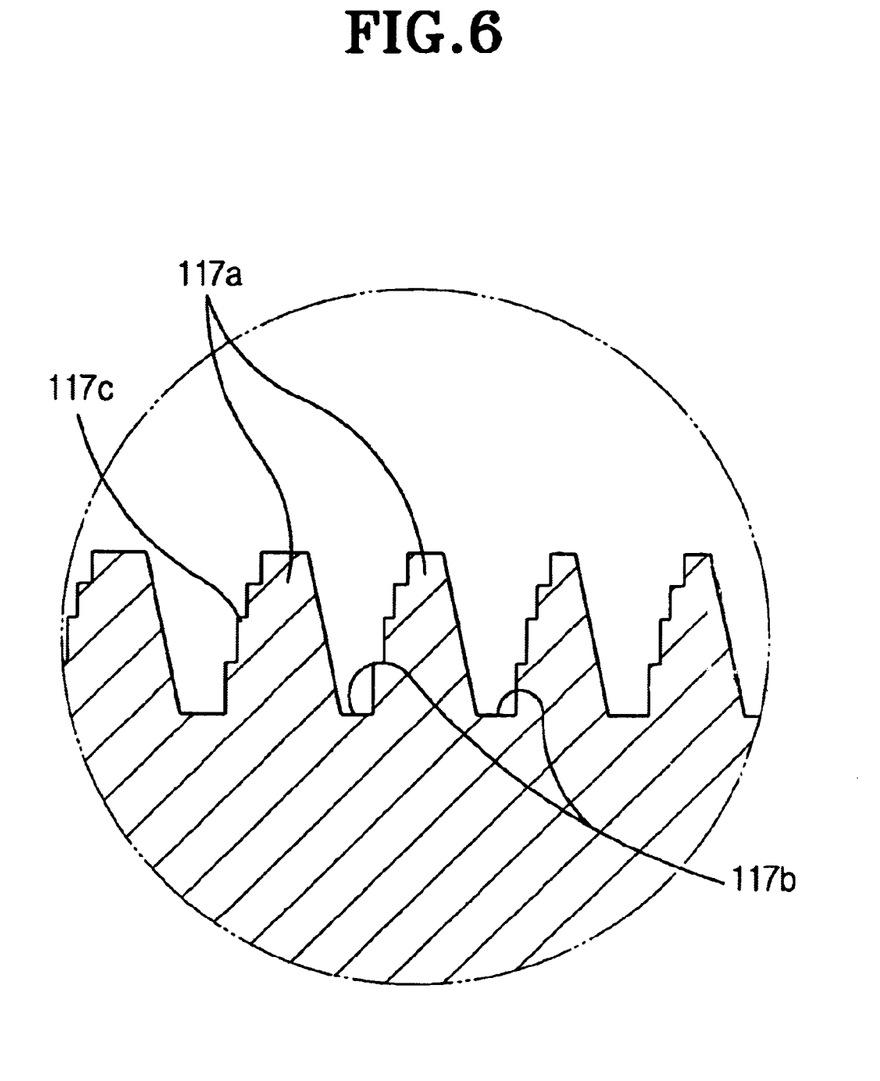
FIG. 6 is an enlarged sectional view of the portion A of the holographic lens shown in FIG. 5B.

FIGS. 4–6 are various views of a holographic lens 117. The holographic lens 117 is disposed between the prism 115 and the light receiving lens 118 of the optical system. The holographic lens 117 is well known in the optical field as an optical element which diffracts and transmits the incident light using patterns 117a and 117b formed on the surface thereof. As shown in FIGS. 4 and 5A, the holographic lens 117, as employed in the preferred embodiment of the present invention, has a concentric annular pattern having a plurality of annular prominences and depressions 117a and 117b. Here, the widths of the respective prominences 117a and widths of the depressions are gradually decreasing from the center toward the most outer circumference of the annular pattern. Further, as shown in FIGS. 5B and 6, the inner surface of each prominence 117a may have a step-like shape having a plurality of steps 117c. The number of the steps 117c may be from three to five, and is preferably four. The steps 117c, enhance the efficiency of the optical conversion of the holographic lens 117.

The pattern formed by the prominences 117a and the steps 117c are designed such that the first laser beam to be projected onto the holographic lens 117 as a convergence ray is converted into the parallel ray while the convergence ray is transmitted. It is believed that those skilled in this art can, based upon the teachings contained herein, design the pattern to meet the requirements of the present invention.

The reproducing of information from a high density optical disk 110 utilizing the second laser beam will now be described with respect to FIG. 3A. As the high density optical disk 110 is loaded on the optical disk drive, the optical pickup 100 is moved to a predetermined place with respect to the optical disk 110 by a driving section (now shown). Then, the laser beam is generated from the second laser beam source 112. The second laser beam is converted into parallel rays while being transmitted through the second collimating lens 114, and then reflected by the prism 115 toward the optical disk 110. In FIG. 3A, parallel rays are indicated by a pair of adjacent parallel arrows. The reflected second laser beam is collected on the signal layer of the optical disk 110 by the objective lens 116. The collected laser beam is reflected from the signal layer of the optical disk 110, transmitted through the objective lens 116, converted into parallel rays, and then projected to the prism 115. The transmitted second laser beam is projected to the holographic lens 117. The holographic lens 117 does not serve as a lens with respect to the second laser beam, so that the second laser beam is simply transmitted through the holographic lens 117. The second laser beam is then collected by the light receiving lens 118 and converged on the surface of the detector, i.e., on the surface of the photo diode 119, in the form of a spot. The photo diode 119 detects the spot formed on the surface thereof, and outputs an electric current signal corresponding to the spot. The outputted electric current signal is inputted to a signal processing section (not shown).

Figure 3B:
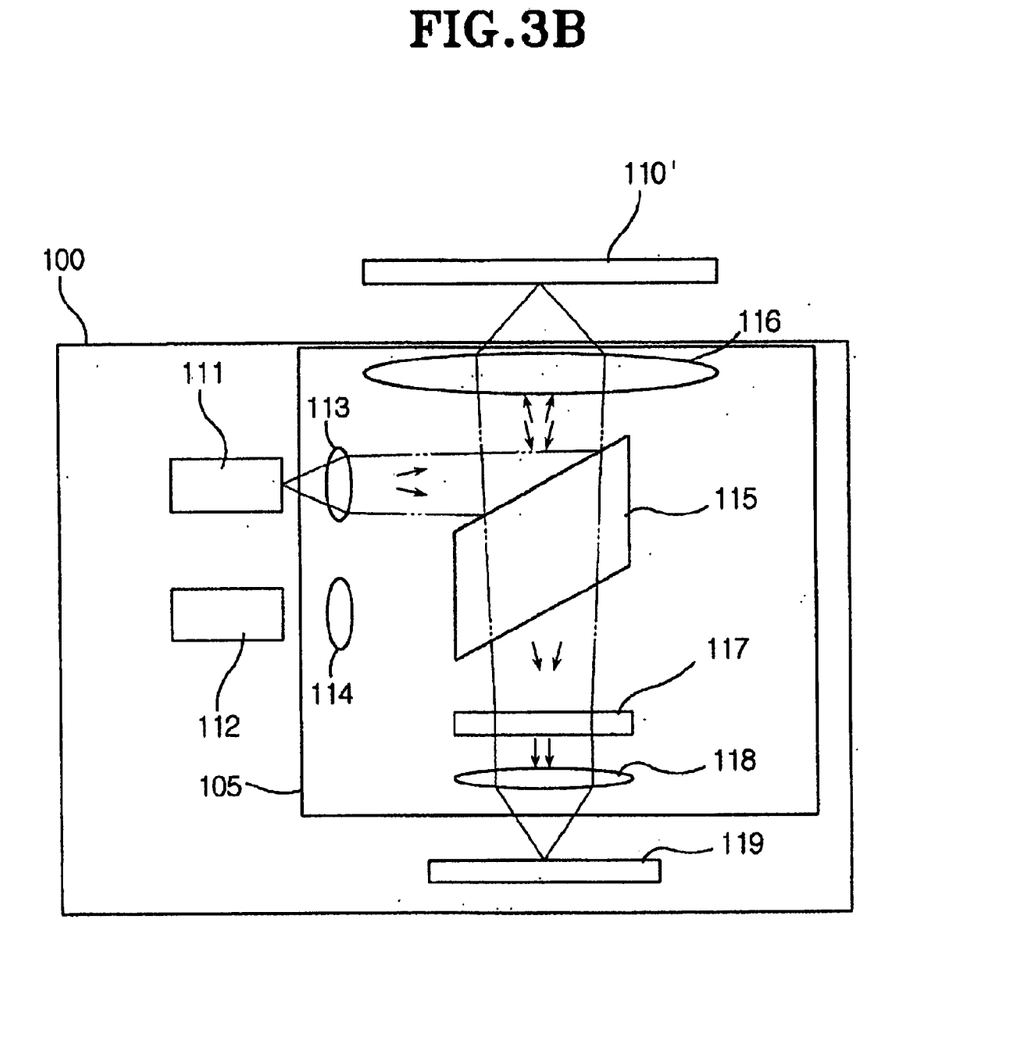
FIG. 3B is a schematic view of the optical pickup according to the preferred embodiment of the present invention showing a light path of a long wavelength laser beam when the information is reproduced from the optical disk by the long wavelength.
Figure 3C:
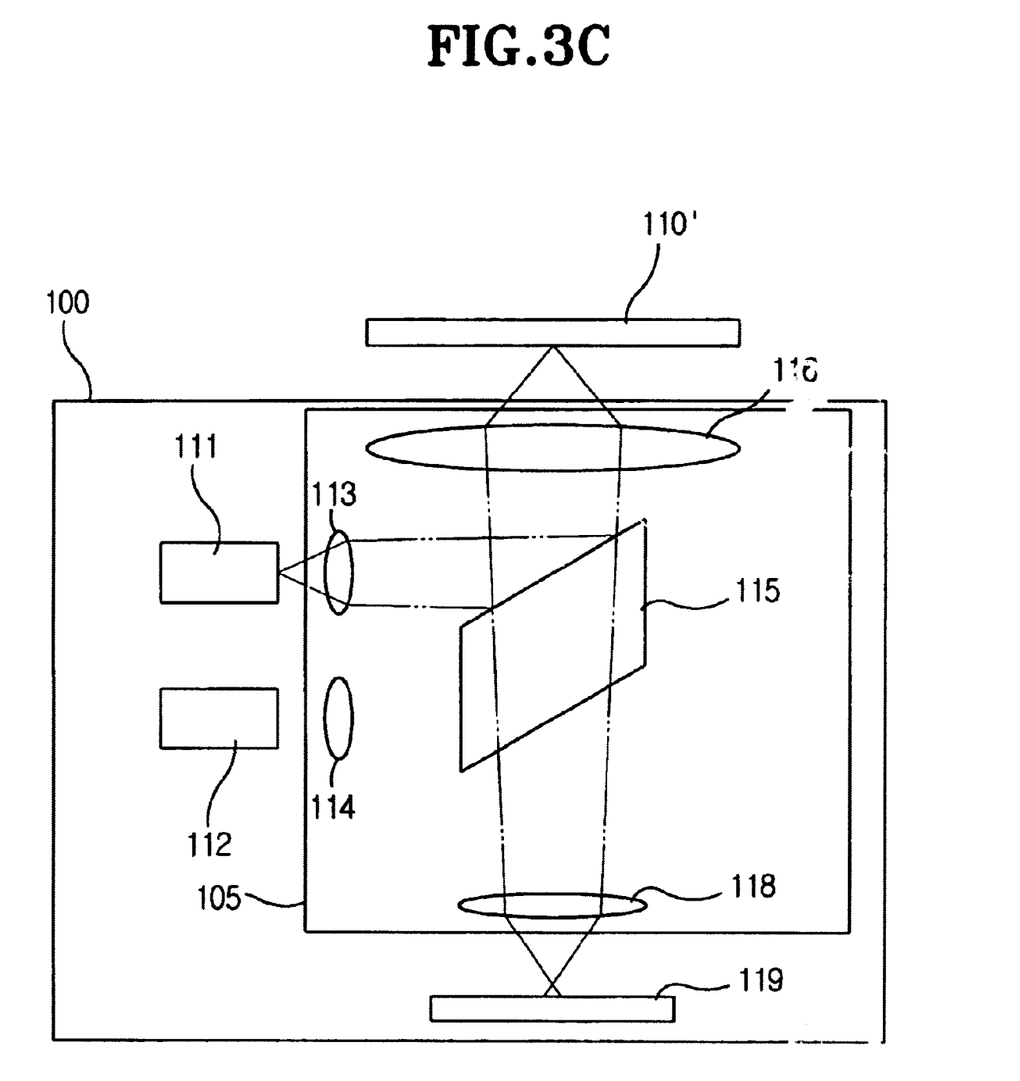
FIG. 3C is a schematic view of the optical pickup according to the preferred embodiment of the present invention showing the light path of the long wavelength laser beam in absence of an holographic lens.

The reproducing of information from a low density optical disk 110' will now be described with reference to FIGS. 3B and 3C. When the low density optical disk 110' is loaded on the optical disk drive a driving section (not shown) moves the optical pickup 100 to a predetermined place with respect to the optical disk 110'. The first laser beam is then generated from the first laser beam source 111. The first laser beam is transmitted through the first collimating lens 113 to be converted into a divergence ray having a predetermined angle. In FIG. 3B a divergence ray is indicated by a pair of adjacent arrows with arrow heads spaced further apart than opposite ends of the arrows; convergence rays are indicated by a pair of adjacent arrows with arrow heads spaced closer together than opposite ends of the arrows; and parallel rays are indicated by a pair of adjacent parallel arrows. The divergence ray is reflected from the prism 115 toward the optical disk 110'. The reflected first laser beam is collected on the signal layer of the optical disk 110' by the objective lens 116. In this situation, since the first laser beam is projected to the objective lens 116 as a divergence ray of a predetermined angle, the fracture surface aberration of the optical spot falls within the acceptable range, even though the optical spot is collected on the signal layer of the optical disk 110' by the objective lens 116 (optimized with respect to the second laser beam). The laser beam reflected from the signal layer of the optical disk 110' is transmitted through the objective lens 116, and projected to the prism 115. Further, since the first laser beam is projected to the objective lens 116 in the form of a divergence ray of a predetermined angle, the first laser beam becomes a convergence ray of a predetermined angle as the first laser beam is reflected from the signal layer of the optical disk 110' and re-transmitted through the objective lens 116. The convergence ray is converged onto the photo diode 119 in the form of a spot after being transmitted through the prism 115, the holographic lens 117, and the light receiving lens 118.

In the absence of the holographic lens 117 between the prism 115 and the light receiving lens 118 (See FIG. 3C), the beam width of the first laser beam projected to the light receiving lens 118 is narrowed substantially. Accordingly, the focus of the first laser beam, which is collected by the light receiving lens 118, is converged to a place between the light receiving lens 118 and the surface of the photo diode 119. Accordingly, the optical spot of the first laser beam on the surface of the photo diode 119 would be formed to a relatively larger size, as shown in FIG. 3C, so that the optical spot is not available. The optical pickup according to the present invention solves the above problem by utilizing the holographic lens 117. More specifically, as shown in FIG. 3B, the first laser beam after being transmitted through the prism 115 is projected to the holographic lens 117 in the form of a convergence ray. The incident first laser beam to the holographic lens 117 is converted into a parallel ray by the holographic lens 117. As shown in FIG. 5A, with one step 117c formed on the surface of the prominence 117a of the pattern of the holographic lens 117, forty percent (40%) of the incident ray is converted into the parallel ray, while, as shown in FIG. 5B, with four steps 117c formed on the surface of the prominence 117a of the pattern of the holographic lens 117, eighty one percent (81%) of the incident ray is converted into a parallel ray. More steps 117c formed on the inner surface of the prominence 117a in a predetermined limit may result in a greater efficiency in optical conversion of the holographic lens 117. When the number of the steps 117c exceeds the predetermined limit, however, there will be no more enhancement of the optical conversion efficiency. As a result, the number of the steps 117c should be three to five, and preferably four.

The first laser beam, which is converted into a parallel ray by the holographic lens 117, is collected by the light receiving lens 118 and converged on the surface of the photo diode 119 in the form of an optical spot substantially the same size as the optical spot produced by the second laser beam. Also, the size of the optical spot of the first laser beam which is collected by the light receiving lens 118 and the size of the optical spot of the second laser beam can be adjusted to be identical by properly adjusting the distance between the holographic lens 117 and the objective lens 116. When the optical spot of the first laser beam is formed on the surface of the photo diode 119, the photo diode 119 detects the optical spot and outputs corresponding electric current signal to signal processing section (not shown).

As described above, according to the present invention, the optical spots of laser beams of different wavelengths are adjusted to be substantially identical with each other in size utilizing the objective lens 116 and the holographic lens 117. FIGS. 3A and 3B illustrate the beam spot having been adjusted to be substantially identical, while FIG. 3C illustrates the first beam having a wider beam spot when holographic lens 117 is not used. Accordingly, a simple structure with fewer parts is realized in which the optical pickup 100 reproduces the information from two difference types of optical disks 110 and 110' using laser beams of different wavelengths. Further, since the structure of the optical pickup 100 is simple, and the number of parts is reduced, the manufacturing cost for the optical pickup and the optical disk drive employing the same is reduced.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. An optical pickup comprising:
   a first laser beam source generating a first beam;
   a second laser beam source generated a second beam having a different wavelength than a wavelength of the first laser beam;
   an optical system diverging the first beam at a predetermined angle, collimating the second beam into a parallel ray, converging the first and second beams to a signal layer of an optical disk, and transmitting the first and second beams as reflected from the signal layer, the first reflected beam being transmitted as a convergent beam and the second reflected beam being transmitted as a parallel beam;
   an optical converter converting the first reflected beam transmitted from the optical system into a parallel beam and passing the second reflected beam without conversion; and
   an optical detector detecting the first and second parallel beams from the optical system, the optical detector being optimized with respect to the second laser beam.

2. The optical pickup as claimed in claim 1, wherein the first and second laser beam sources comprise laser diodes.

3. The optical pickup as claimed in claim 1, wherein the optical system comprises:
   a first collimating lens diverging the first beam at the predetermined angle, the predetermined angle permitting a fracture surface aberration of the first beam to fall below a predetermined value when the first abeam generated from the first laser beam source is collected on the signal layer of the optical disk;
   a second collimating lens converting the second laser beam generated from the second laser beam source into the parallel ray;
   a prism reflecting the first and second beams transmitted through the first and second collimating lenses toward the optical disk, while transmitting the first and second beams reflected from the signal layer of the optical disk;
   an objective lens converging the first and second beams reflected from the prism onto the signal layer of the optical disk; and
   a light receiving lens converging the first and second beams reflected from the signal layer of the optical disk on the optical detector in the form of an optical spot of a predetermined size.

4. The optical pickup as claimed in claim 3, wherein the first beam has a wavelength of 640–660 nm or 770–800 nm and the second beam has a wavelength of 400–420 nm.

5. The optical pickup as claimed in claim 1, wherein the optical detector comprises a photo diode.

6. The optical pickup as claimed in claim 1, wherein the optical converter comprises a holographic lens having a pattern by which the second reflected beam is directly transmitted without conversion, while the first reflected beam is converted into the parallel beam.

7. The optical pickup as claimed in claim 6, wherein the pattern has a concentric annular concave-convex portion in which a plurality of annular prominences and depressions are arranged.

8. The optical pickup as claimed in claim 7, wherein the depression and the prominence have a width that gradually decreases from the center of the optical converter toward the most outer circumference of the concentric annular concave-convex portion.

9. The optical pickup as claimed in claim 7, wherein an inner surface of each prominence has a step-like shape formed with at least one step.

10. The optical pickup as claimed in claim 9, wherein the number of the step ranges from three to five.

11. An optical pickup comprising:
a first laser beam source generating a first laser beam having a wavelength of 640–660 nm or 770–800 nm:
a second laser beam source generating a second laser beam having a wavelength of 400–420 nm:
an optical system comprising:
a first collimating lens diverging the first laser beam at a predetermined angle ranging from 0.4° to 0.6° that permits a fracture surface aberration of the first laser beam to fall below a predetermined value less than or equal to 0.008λ when the first laser beam generated from the first laser beam source is collected on the signal layer of the optical disk, wherein λ is the wavelength of the first laser beam,
a second collimating lens converting the second laser beam generated from the second laser beam source into a parallel ray.
a prism reflecting the laser beams transmitted through the first and second collimating lenses toward the optical disk, while transmitting the laser beams reflected from the signal layer of the optical disk,
an objective lens collecting the laser beams reflected from the prism onto the signal layer of the optical disk; and
a light receiving lens collecting the laser beam reflected from the signal layer of the optical disk on the optical detector in the form of an optical spot of a predetermined size;
an optical detector detecting the first and second laser beams transmitted from the optical system, the optical detector being optimized with respect to the second laser beam: and
an optical converter converting the first laser beam transmitted from the optical system into the laser beam detectable by the optical detector.

12. An optical pickup comprising:
a first laser diode generating a first laser beam;
a second laser diode generating a second laser beam having a different wavelength than the first laser beam;
a first collimating lens diverging the first laser beam at a predetermined angle;
a second collimating lens converting the second laser beam into parallel rays;
a prism reflecting the laser beams transmitted through the first and second collimating lenses toward an optical disk, and transmitting reflected laser beams from a signal layer of the optical disk;
an objective lens collecting the reflected laser beams from the prism on the signal layer of the optical disk;
a light receiving lens collecting the reflected laser beams from the signal layer of the optical disk in the form of optical spot of a predetermined size;
a photo diode detecting the optical spot collected by the light receiving lens; and
a holographic lens converting the first laser beam into parallel rays so as to form the optical spot, of the first and second laser beams having identical sizes and passing the second laser beam without conversion.

13. An optical disk drive comprising:
an optical pickup projecting a laser beam to an optical disk and detecting a signal from the reflected laser beam, said optical pickup comprising:
first and second laser beam sources generating a first and second laser beams respectively, the first and second laser beams having different wavelengths;
a first collimating lens diverging the first laser beam at a predetermined angle,
a second collimating lens converting the second laser beam into parallel rays,
a prism reflecting the laser beams transmitted through the first and second collimating lenses toward the optical disk, and transmitting the first and second laser beams as reflected from the signal layer of the optical disk,
an objective lens collecting laser beams reflected from the prism on the signal layer of the optical disk,
a detector detecting the first and second laser beams as reflected from the signal layer of the optical disk, and
a light receiving lens collecting laser the reflected laser on the detector in a form of an optical spot of a predetermined size, and
an optical converter converting the first reflected laser beam to a parallel beam and passing the second reflected laser beam without conversion, the optical converter comprising a holographic lens having a pattern converting the first laser beam into parallel rays to cause the size of the optical spots generated by the first and second laser beams to be identical;
a driving section moving the optical pickup to a desired portion of the optical disk;
a signal processing section processing the signal detected by the optical pickup and converting the signal into information; and
a controlling section controlling the optical pickup, the driving section, the signal processing section.

14. The optical disk drive as claimed in claim 13, wherein the first and second laser beam sources comprise laser diodes.

15. The optical disk drive as claimed in claim 13, wherein the detector comprises a photo diode.

* * * * *

UNITED STATES PATENT AND TRADEMARK OFFICE
CERTIFICATE OF CORRECTION

PATENT NO. : 7,079,471 B1
APPLICATION NO. : 09/442095
DATED : July 18, 2006
INVENTOR(S) : Chong-sam Chung et al.

It is certified that error appears in the above-identified patent and that said Letters Patent is hereby corrected as shown below:

Column 8, line 48, change "abeam" to -- beam --

Column 9, line 27, change " : " to -- ; --

Column 9, line 29, change " : " to -- ; --

Column 9, line 30, change " : " to -- ; --

Column 9, line 41, change " . " to -- ; --

Column 9, line 56, change " : " to -- ; --

Signed and Sealed this

Twenty-sixth Day of December, 2006

JON W. DUDAS
*Director of the United States Patent and Trademark Office*